C. H. STINSON.
TRANSMISSION MECHANISM.
APPLICATION FILED OCT. 23, 1916.

1,274,467.

Patented Aug. 6, 1918.
3 SHEETS—SHEET 2.

Witnesses
H. L. Opsahl.
E. C. Wells

Inventor
C. H. Stinson
By his Attorneys

C. H. STINSON.
TRANSMISSION MECHANISM.
APPLICATION FILED OCT. 23, 1916.

1,274,467.

Patented Aug. 6, 1918.
3 SHEETS—SHEET 3.

Witnesses
H. L. Opsahl.
E. C. Wells

Inventor
C. H. Stinson
By his Attorneys

UNITED STATES PATENT OFFICE.

CHARLES H. STINSON, OF WATERTOWN, SOUTH DAKOTA.

TRANSMISSION MECHANISM.

1,274,467.  Specification of Letters Patent.  Patented Aug. 6, 1918.

Application filed October 23, 1916. Serial No. 127,087.

*To all whom it may concern:*

Be it known that I, CHARLES H. STINSON, a citizen of the United States, residing at Watertown, in the county of Codington and State of South Dakota, have invented certain new and useful Improvements in Transmission Mechanism; and I do hereby declare the following to be a full, clear, and exact description of the invention, such as will enable others skilled in the art to which it appertains to make and use the same.

My invention has for its object to provide a simplified and improved variable speed reversible transmission mechanism for tractors, and to such ends, generally stated, the invention consists of the novel devices and combinations of devices hereinafter described and defined in the claims.

In this improved transmission mechanism, all of the various manipulations thereof for variable speed and reverse and neutral, are controlled by a common lever, and the co-operating controller shaft that is given both endwise sliding and rotary or oscillatory adjustments by the said lever. The novel relative arrangement of the controlling lever, controlling shaft, lock segment and gear connections constitutes the chief novelty of the present invention, the preferred form of which is illustrated in the accompanying drawings wherein like characters indicate like parts throughout the several views.

Referring to the drawings:

Fig. 5 is a fragmentary view in elevation showing parts in the vicinity of the parts marked 5—5 on Fig. 1;

Figure 2:
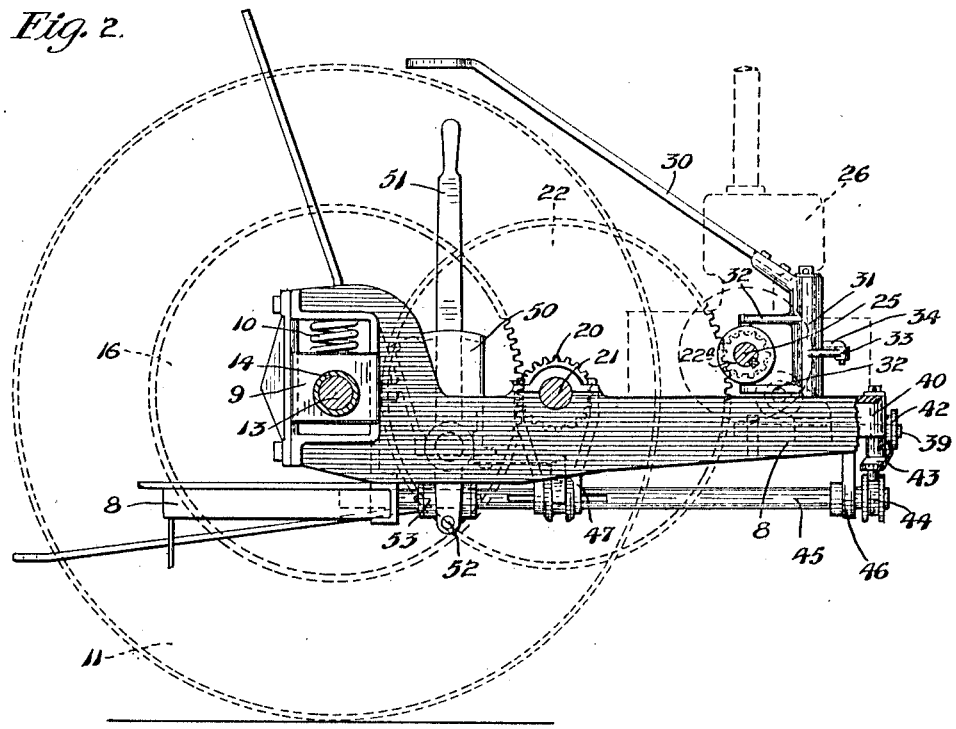
Fig. 2 is a vertical section on the line 2—2 of Fig. 1, some parts being indicated by dotted lines only.

So far as this invention is concerned, the tractor frame may be of any suitable form, but, as illustrated, it is a rectangular skeleton casting 8 provided in the rear portion of its sides with vertically movable bearings 9 which carry the said frame through cushioning springs 10 best shown in Fig. 2.

The rear traction wheels 11 and 12, respectively, are connected rigidly and loosely to a rear axle 13. This rear axle 13 is extended through both bearings 9 and is directly journaled in the left hand bearing. A sleeve or tubular shaft 14 is extended through the right hand bearing 9 and the right hand end of the axle 13 is extended through and journaled therein. This sleeve 14 is connected to rotate with the right hand traction wheel 12, as shown, by means of interlocking clutch elements 15. (See Fig. 1). The two traction wheels are driven through a compensating gear made up of a master wheel or gear 16, opposing beveled gears 17 and 18 and planetary pinions 19. The master gear 16 is loose on the axle 13; the pinions 15 are journaled to said master wheel and mesh with the teeth of the opposite gears 17 and 18. The gear 18 is either integral with, or rigidly secured to, the tubular shaft 14, and hence, rotates with the right hand traction wheel 12; and the gear 17 is carried, or otherwise secured to the said axle 13 and hence, rotates with the left hand traction wheel 11.

The master gear 16 meshes with a pinion 20 carried by a counter shaft 21 journaled in suitable bearings on the main frame 8. Two large spur gears 22 and 23, the former being larger than the latter, are secured to a common hub 24 that is made to rotate with the counter shaft 21 that is free to slide thereon.

The gears 22 and 23 are engageable, respectively, with pinions 22ª and 23ª secured to a driving shaft 25, also journaled in suitable bearings on the main frame 8. The said pinions 22ª and 23ª are so spaced apart that the two gears 22 and 23, in a neutral position of the transmission mechanism, may be located between the same and in engagement with neither thereof.

Mounted on the main frame 8 is a motor, preferably an explosive engine, indicated as an entirety by the numeral 26. The crank shaft of this engine is adapted to be connected to the driving shaft 25 by a friction clutch of any suitable construction, but which, as shown, comprises an internal clutch pulley 27 secured to the said engine crank shaft and coöperating with a sliding clutch pulley 28 that is keyed to rotate with the said driving shaft and has a grooved hub 28ᵃ. On the outer end of the driving shaft 25 there is preferably a pulley 29 adapting the tractor to be used as a stationary power plant.

The sliding clutch cone 28 is adapted to be moved into and out of frictional engagement with the clutch member 27, by means of a lever 30 (see Figs. 1 and 2), the hub 31 of which is pivoted on a vertical post rigidly secured on the main frame 8. This hub has parallel arms 32, the trunnion-like ends of which engage the grooved hub 28ᵃ of the clutch 28. Also, the hub 31 has a short arm 33 that is connected by a link 34 to a brake lever 35 (see Figs. 1 and 5), that is intermediately pivoted to a stud 36 depending from the frame 8. At its free end, this brake lever 35 has a shoe that is engageable with a brake wheel or flange shown as formed on one edge of the pulley 29. The arrangement of levers and connections just described is such that when the clutch cone 28 is moved out of engagement with the clutch member 27, to thereby disconnect the driving shaft 25 from the engine crank shaft, the shoe of the brake lever 25 will be set on the brake wheel 29ᵃ and thereby stop the rotation of said driving shaft and the gears driven therefrom. When, however, the clutch cone 28 is engaged with the clutch member 27 to connect the driving shaft 25 to the engine crank shaft, the brake lever will be released from the wheel 29ᵃ, so that the said driving shaft is then free to rotate.

Figure 1:
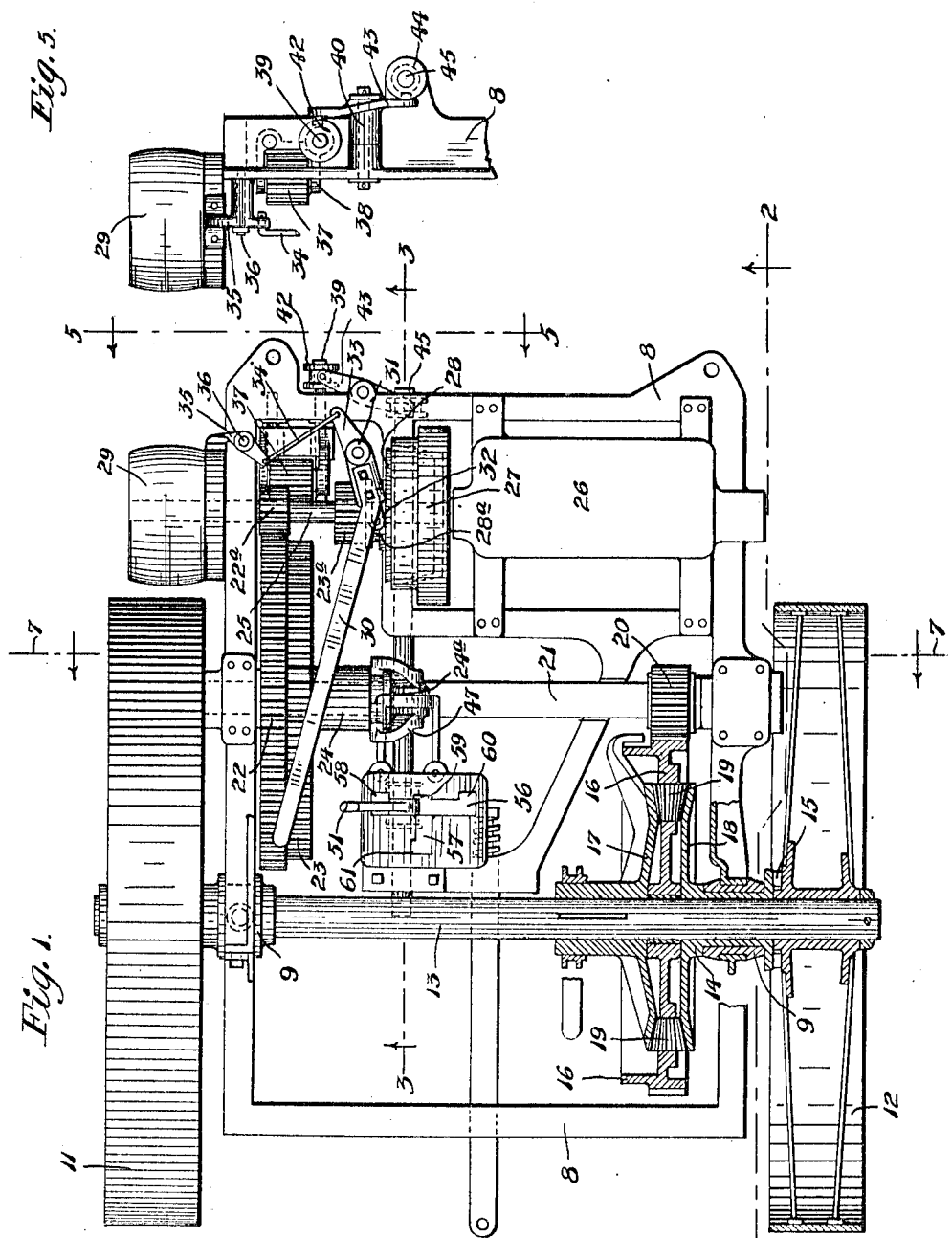
Figure 1 is a plan view with some parts in horizontal section showing a tractor with my improved transmission mechanism applied thereto, the front wheels and certain other parts of the tractor being removed.

When the gear 22 is engaged with the pinion 22ᵃ, as shown in Fig. 1, the tractor will be driven forward at a relatively low speed and when the two gears are slid laterally so as to disengage the gear 22 from pinion 22ᵃ and engage the gear 23 with pinion 23ᵃ, the tractor will be driven forward at a relatively high speed. When the two gears are moved to intermediate or neutral position between the pinions 22ᵃ and 23ᵃ, no motion, whatever, will be transmitted to the traction wheels.

For reverse or backward drive of the tractor, there is provided a wide-faced reverse pinion 37. This pinion is journaled to a pronged bearing 38 that is secured to horizontal rods 39 mounted to slide through bearing flanges 40 and 41 on the front left hand portion of the frame 8. One of the sliding rods 39, at its front end, has a grooved hub 42 that is engaged by a stud on the end of a shipper lever 43 that is intermediately pivoted to the bearing flange 40, and, at its inner end, has a stud that engages a grooved hub 44 secured to the front end of a controller shaft 45 that is mounted for both sliding and oscillatory movements in depending bearing lugs 46 on the frame 8.

The intermediate portion of the controller shaft 45 is arranged to slide through, but caused to oscillate with a shipper fork 47, the arms of which are provided at their ends with trunnion-like lugs that engage the annular groove 24ᵃ of the sliding gear hub 24. This fork 47, while free for oscillatory movements transversely of the machine, is anchored against sliding movements with the shaft 45, by a bracket 49. This anchor bracket 49, at its projecting end, engages an annular groove of the hub of the fork 47 and at its other end, it is rigidly secured to a box-like casting or structure 50 that is rigidly secured to the main frame 8 and constitutes a fulcrum and latch segment for the controlling lever 51. This controlling lever 51 has a pronged lower end that embraces and is pivotally connected at 52 to a collar 53 secured to the controller shaft 45. Slightly above its pronged lower end, the said lever 51 is formed with a cylindrical fulcrum hub 54 that works closely between parallel transversely extended bearing surfaces 55 formed on the casting 50 and serving as a fulcrum for the lever 51 in its forward and rearward oscillatory movements. These fulcrum surfaces 55, however, permit the lever to be oscillated bodily transversely of the machine, the shaft 45 then serving as a pivot and moving with the said lever. In its top web, the casting 50 is formed with a transverse lever guiding slot 56 which has an intermediate rearward extension 57. The slot 56, at its front edge has three notches 58, 59 and 60, with which the lever 51 may be engaged and the slot 57 has a notch or offset 61 with which also the said lever may be engaged. The said notches simply serve to hold or to assist in holding the lever in certain predetermined positions presently to be noted.

Figures 3, 4:
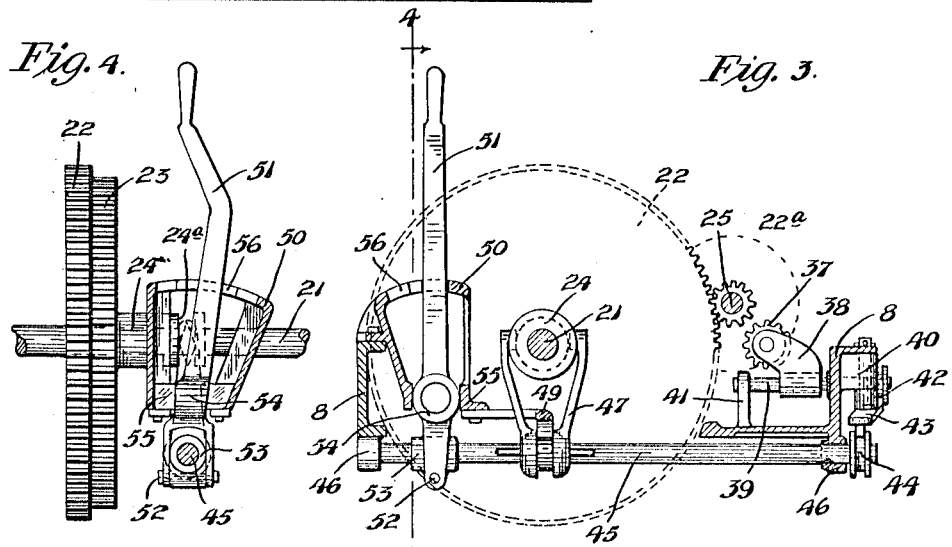
Fig. 3 is a section on the line 3—3 of Fig. 1, some parts being indicated by dotted lines.
Fig. 4 is a transverse vertical section taken approximately on the line 4—4 of Fig. 3.
Figure 6:
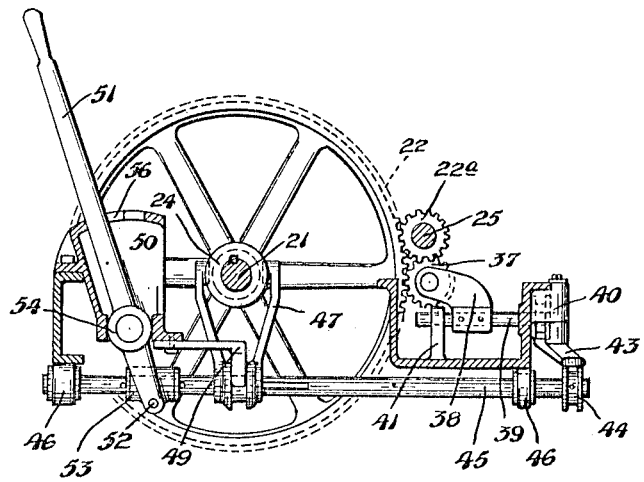
Fig. 6 is a view corresponding to Fig. 3 but illustrating different adjustments of the transmission gears and certain other parts.
Figure 7:
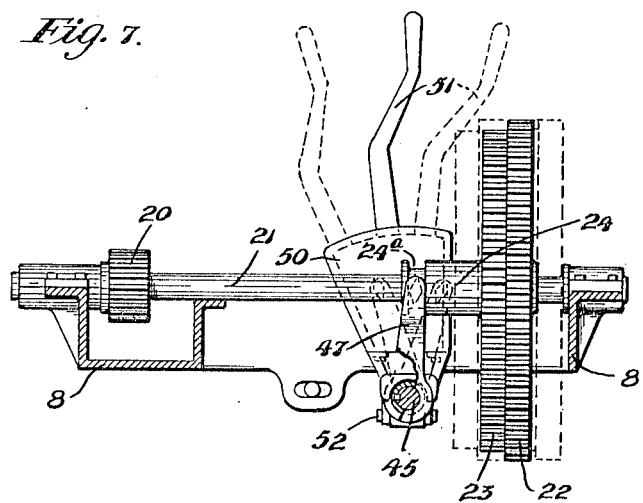
Fig. 7 is a section of certain of the parts on the line 7—7 of Fig. 1.

When low speed forward is desired, the controller lever 51 is moved in the slot 56 toward the left and either into engagement or into alinement with the notch 58. This moves the gear into mesh with the pinion 22ᵃ, while the wide faced reverse pinion 37 is retracted, as shown in Fig. 3. To throw the transmission mechanism into neutral position, the lever 51 is moved into engagement or alinement with the notch 59, and this moves the two gears 22 and 23 into idle or neutral positions between the pinions 22ᵃ and 23ᵃ. When it is desired to drive the machine forward at a relatively high speed, the lever 51 is moved in a slot 56 toward the right and into alinement or engagement with the notch 60, and this slides the gear 22 out of mesh with the pinion 22ᵃ and the gear 23 into mesh with the pinion 23ᵃ, while, of course, still holding the reverse pinion 37 in its retracted position. To cause the tractor to be driven backward, the lever 51 is moved into the slot extension 57 and back to the notch 61 and this moves the wide faced reverse pinion 37 into mesh with the pinion 22ª and gear 22, while the said gear 22 is disengaged from said pinion 22ª, and while the gear 23 is disengaged from the pinion 23ª (see Fig. 6) and also note the intermediate position of the two gears 22 and 23 shown in Fig. 7.

The described and illustrated arrangement of the compensating or differential gear, and wherein one of the beveled gears thereof is secured to rotate with the complete rear axle, while the other beveled gear is connected to the hub of one of the traction wheels, eliminates the use of what is usually designated as "bull gears" and which are usually secured directly to the drive wheels. Otherwise stated, a complete, or one base axle is used and this axle directly drives but one of the traction wheels, the other traction wheel being driven through a sleeve or tubular shaft from one of the beveled gears of the differential.

The above described construction also adapts the entire differential gear mechanism to run in oil when a suitable casing is provided.

What I claim is:

1. In a transmission mechanism having forward and reverse driving gears, a controller shaft mounted for endwise and rocking movements, the one movement of said shaft serving to move certain of said gears into and out of action and the other movement thereof serving to throw the reverse gears into and out of action, and a controlling lever having at its intermediate portion a shiftable fulcrum, and which lever is arranged to rock on its fulcrum to impart one of said movements to said controller shaft and has a movement in another direction that shifts its said fulcrum to impart the other of said movements to said controller shaft.

2. In a transmission mechanism, the combination with a driving shaft having laterally spaced pinions of different diameters, of a driven shaft having laterally adjustable gears of different diameters adapted to mesh, one with each of said pinions but movable into a neutral position between the same, a wide faced reverse pinion movable into and out of mesh with one of the pinions of said driving shaft and with one of the gears of said driven shaft when said two gears are in neutral position, and a lever having connections to the said gears and reverse pinion for effecting the above noted adjustment.

3. In a transmission mechanism, the combination with a driving shaft having laterally spaced pinions of different diameters, of a driven shaft having laterally adjustable gears of different diameters adapted to mesh, one with each of said pinions but movable into a neutral position between the same, a wide faced reverse pinion movable into and out of mesh with one of the pinions of said driving shaft and with one of the gears of said driven shaft when said two gears are in neutral position, a controller shaft mounted for endwise and oscillatory movements, connections whereby endwise movements of said shaft will move said reverse pinion into and out of operative position, and connections whereby oscillatory movements of said shaft will move the gears of said driven shaft to and from neutral position.

4. In a transmission mechanism, the combination with a driving shaft having laterally spaced pinions of different diameters, of a driven shaft having laterally adjustable gears of different diameters adapted to mesh, one with each of said pinions, but movable into a neutral position between the same, a wide faced reverse pinion movable into and out of mesh with one of the pinions of said driving shaft and with one of the gears of said driven shaft, when said two gears are in neutral position, a controller shaft mounted for endwise and oscillatory movements, connections whereby endwise movements of said shaft move said reverse pinion into and out of operative position, connections whereby oscillatory movements of said shaft will move the gears of said driven shaft to and from neutral position, a controller lever having connections for oscillating said shaft for moving the same endwise, and a lever regulating device permitting said lever to move said shaft endwise only when oscillated to a position in which said gears are in neutral position.

5. In a transmission mechanism, the combination with a driving shaft having laterally spaced pinions of different diameters, of a driven shaft having laterally adjustable gears of different diameters adapted to mesh, one with each of said pinions but movable into a neutral position between the same, a wide faced reverse pinion movable into and out of mesh with one of the pinions of said driving shaft and with one of the gears of said driven shaft when said two gears are in neutral position, a controller shaft mounted for endwise and oscillatory movements, connections whereby endwise movements of said shaft will move said reverse pinion into and out of operative position, connections whereby oscillatory movements of said shaft will move the gears of said driven shaft to and from neutral position, a controller lever for moving said shaft, as stated, and a lever regulating device having a transverse slot with an intermediate lateral extension, movements of said lever in said transverse slot serving to move said gears to and from neutral position, and movements of said lever into the lateral extension of said slot serving to move said reverse pinion to and from operative position.

In testimony whereof I affix my signature in presence of two witnesses.

CHARLES H. STINSON.

Witnesses:
LESLIE STINSON,
F. D. MERCHANT.